Figure 1:
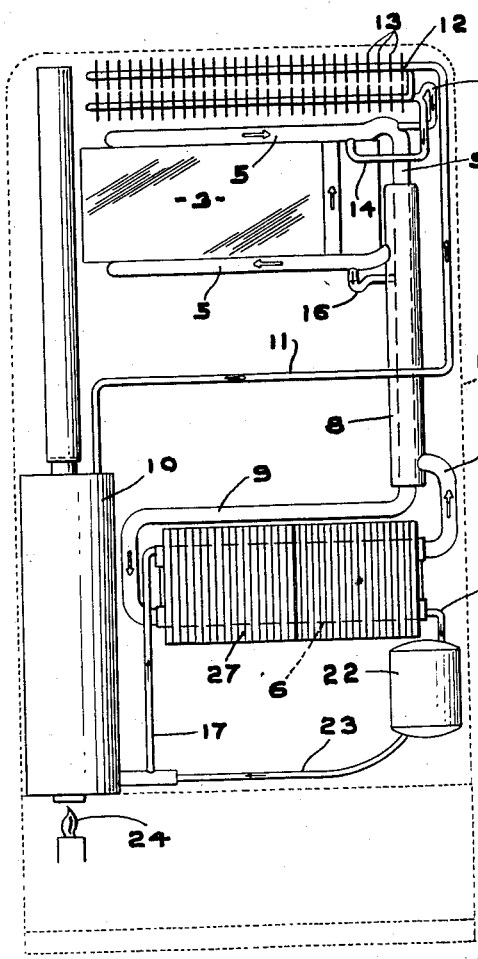

Nov. 3, 1959

W. L. EDEL 2,911,056

ABSORBER

Filed March 5, 1957

3 Sheets-Sheet 1

INVENTOR
Walter L. Edel

BY Thomas W. J. Clark

ATTORNEY

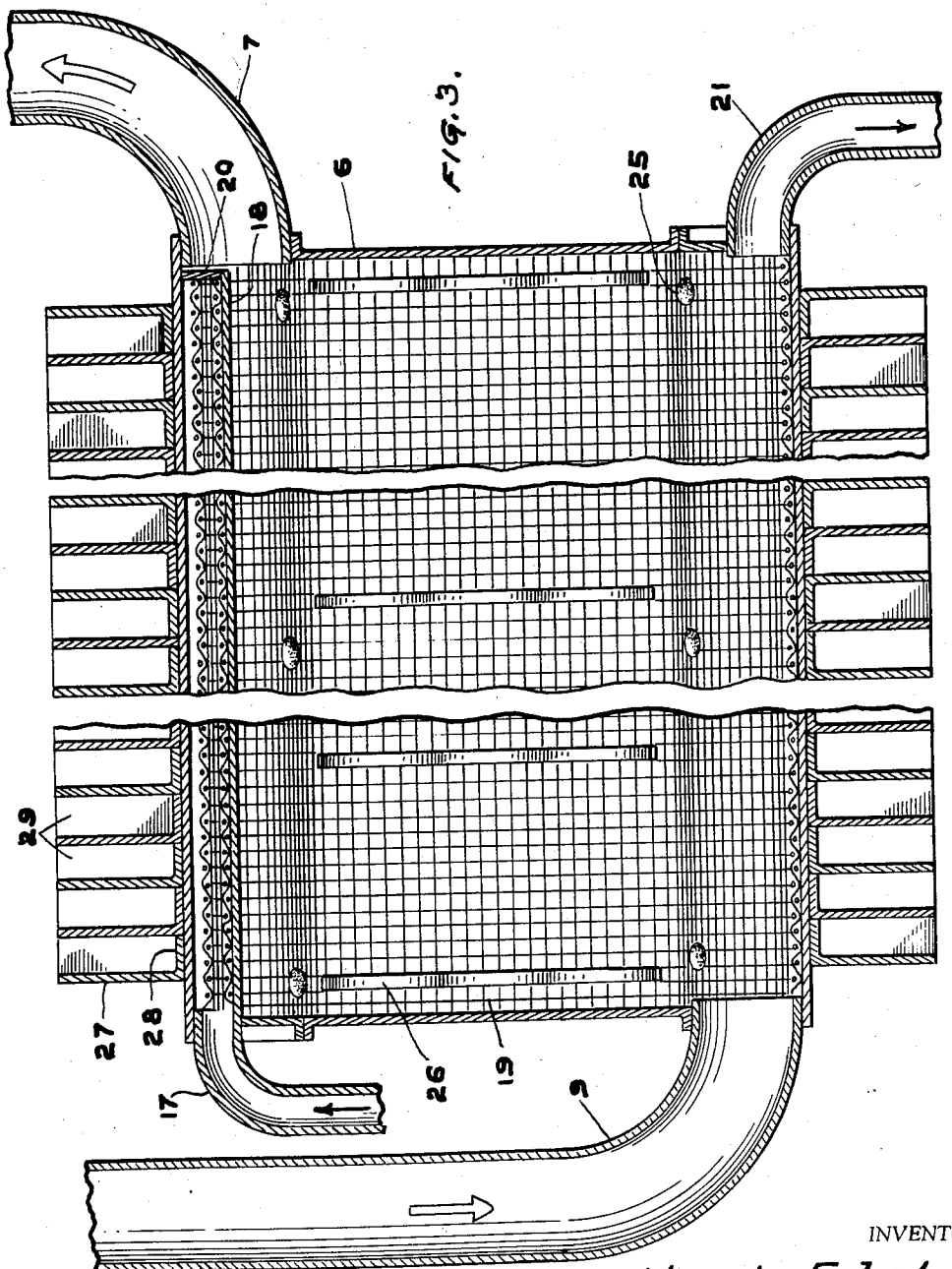

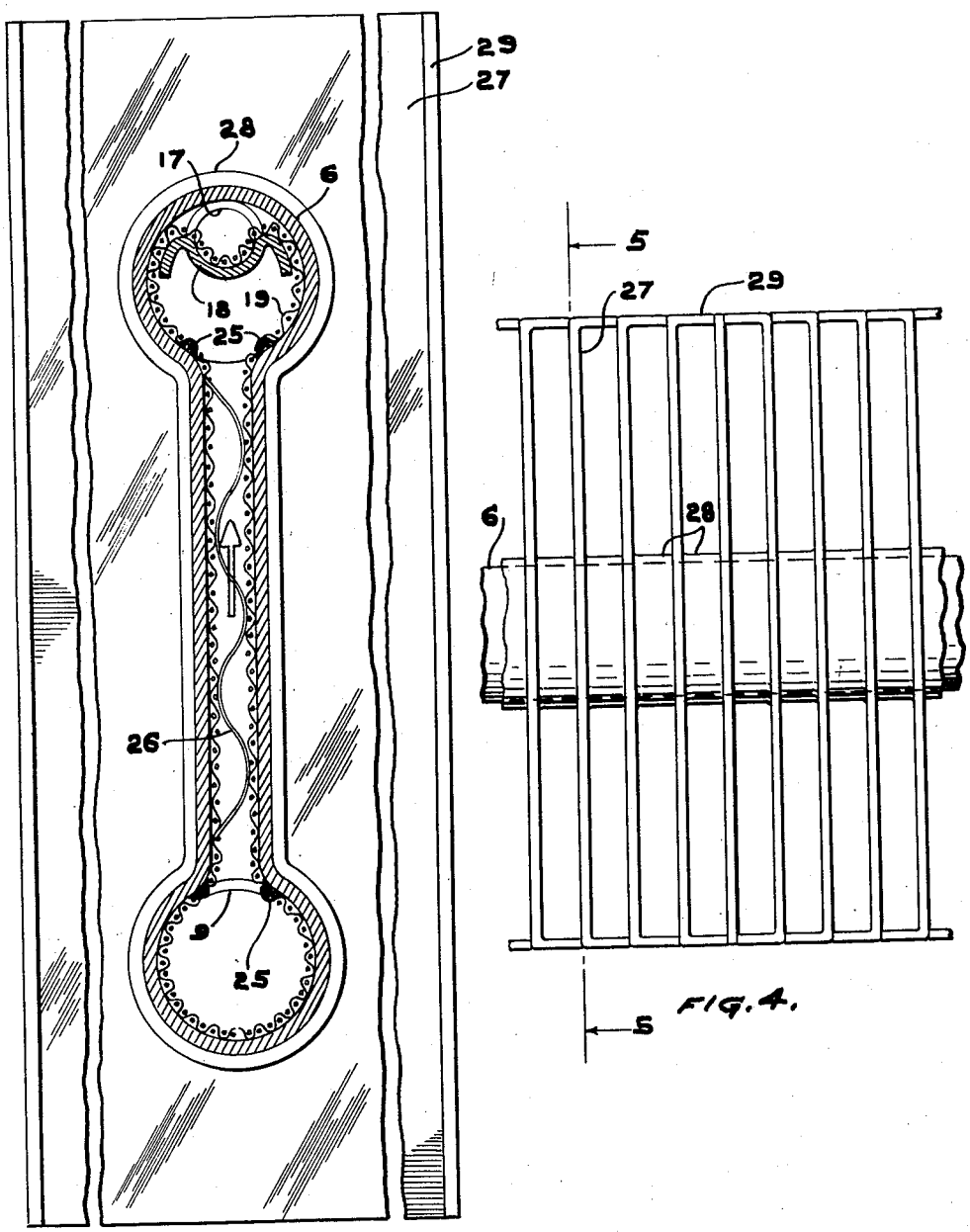

United States Patent Office 2,911,056
Patented Nov. 3, 1959

2,911,056
ABSORBER
Walter L. Edel, Baltimore, Md.
Application March 5, 1957, Serial No. 643,969
15 Claims. (Cl. 183—2)

This invention relates to apparatus for the absorption of a vapor from an inert gas vapor mixture at higher than atmospheric pressure by a liquid absorbent, the heat generated thereby being dissipated to the ambient cooling atmospheric air. In particular it applies to the absorber of a uniform pressure absorption refrigerator in which the usual inert gas is hydrogen, the refrigerant is liquid and vaporous ammonia and the absorbent is water. Other combinations of substances can be used. In this combination of substances, the total pressure within the apparatus can in extreme operating condition be as high as about 400 pounds per square inch. Its use is not necessarily limited to refrigeration apparatus of this type although it is described in this connection.

The principal objects of an absorber in this connection are to present a large surface in intimate contact, between the gas mixture and the absorbent liquid flowing countercurrent, efficient heat transfer from the absorbent liquid to large external air cooled surfaces, free space for the passage of large quantities of cooling air by these surfaces, minimum internal resistance to the flow of the inert gas mixture, structural strength to withstand a pressure difference between the inside and outside of several times the maximum operating pressure, and minimum cost of production.

These objects are obtained to a greater degree than in any other absorber and especially the usual type absorber used with uniform pressure absorption type refrigerators comprising a series of substantially horizontal, finned tubes serially connected to form a length of about eight feet.

In addition, by virtue of its very low resistance to the flow of the gas mixture, the diameter of the tubing comprising the remainder of the gas mixture circuit in the total apparatus can be reduced, thereby further reducing the cost of the whole apparatus.

Furthermore, due to the more intimate contact, over a larger surface of the gas mixture and the absorbent liquid, more effective absorption takes place, improving the operating performance. Also, because the internal volume of this new absorber is considerably less, the volume of hydrogen within the whole apparatus is decreased, making it possible to decrease the total working pressure to a greater extent below maximum, when operating at low ambient air temperature. This improves the economy of operation. Also, because of the low resistance to cooling air flow, the required space depth in the back of the refrigerator is desirably decreased. Less costly material and labor are used in this absorber. The internal gas pressure forces the wall of the absorber casing tightly against the inner edge of the supporting fins, insuring intimate contact for efficient heat transfer to the air cooled fins.

Figure 2:
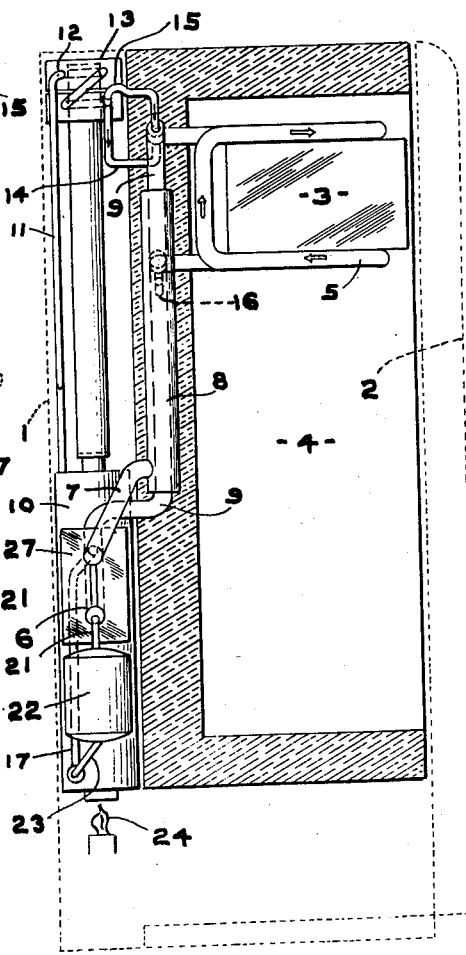

In the drawing, forming a part hereof:
Figure 1 is a rear elevational view of a refrigerator cabinet in outline showing the refrigerating apparatus of this invention.
Figure 2 is a vertical cross-sectional view thereof.

Figure 6:
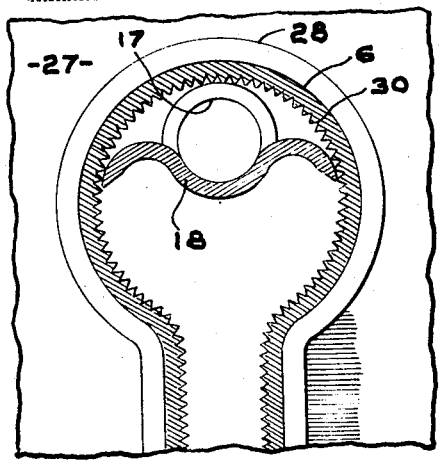
Figure 7:
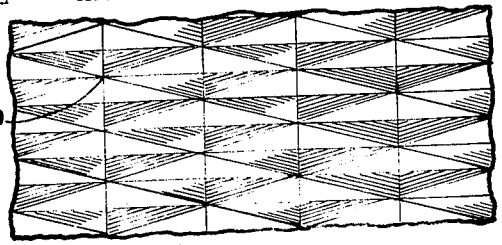

Figure 3 is an enlarged vertical cross-section of the absorber of this invention and its connections.
Figure 4 is a fragmentary top plan view of the absorber.
Figure 5 is a vertical sectional view on line 5—5 of Figure 4.
Figure 6 is a vertical enlarged fragmentary sectional view showing grooves on the inner wall of the body of the absorber.
Figure 7 is an enlarged fragmentary view of the grooves on the wall of the absorber body.

In the drawings similar numerals refer to similar parts throughout the several views.

The cabinet 1 has an access door 2 opening to a freezing compartment 3 and a chilling compartment 4.

The freezing compartment 3 has bonded thereto an evaporator coil 5 which provides freezing temperature for the freezing compartment 3 and chilling temperature for the chilling or food compartment 4.

Hydrogen gas substantially freed from ammonia vapor leaves the absorber 6 through conduit 7 and enters the heat interchanger 8 where it is cooled by the returning still cold hydrogen ammonia mixture in conduit 9 before entering the evaporator 5 in which it passes around the bottom of the freezing compartment 3 and then upwardly and around the top of the freezing compartment before returning in conduit 9 to the absorber. This comprises the hydrogen circuit.

Ammonia vapor generated in the boiler 10 is led by conduit 11 to condenser 12 surrounded by fins 13 where it is liquified and drains by gravity through conduit 14 to the evaporator 5. Since small amounts of hydrogen gas may be liberated in the generator and pass to the condenser and the whole condenser internal volume is not always used for condensing, the remaining variable volume is occupied by hydrogen gas so that it is necessary to vent the condenser by conduit 15 to the hydrogen circuit conduit 9. The counter flow of ammonia and hydrogen in the evaporator 5 evaporates the liquid ammonia and imparts freezing temperature to the freezing compartment 3. The mixed ammonia and hydrogen flow back through conduit 9 to absorber 6. Fluid trapped in the lower section of the evaporator 5 is led to conduit 9 through conduit 16.

Water has an affinity for absorbing the ammonia in the hydrogen ammonia mixture and enters the absorber 6 through conduit 17.

The top of the conduit within the absorber 6 is cut longitudinally and the sides are bent over to form the trough shown at 18 for the flow of water. The absorber itself is shaped much like a dumb-bell in cross-section, with a tubular top and bottom and preferably with plane intermediate surfaces. Within the absorber is a screen 19 which substantially conforms to the whole of the inner walls of the absorber except at the top where it is bent down and lies in the inner surface of the trough 18, the outlined edges of the trough being spaced from the upper tubular surface of the absorber so that the screen can pass between the trough and the absorber and be in close contact with both. The trough 18 is closed at its far end as at 20 so that the water entering the trough overflows the sides of the trough and spreads by gravity and capillary action and surface tension down substantially over the whole inner wall of the absorber, thus giving a large area of water for the absorption of the ammonia from the hydrogen as this mixture of hydrogen and ammonia which enters the absorber through the conduit 9 and passes into the lower tubular section of the absorber and then passes through the vertical portion of the absorber. The ammonia vapor and hydrogen mixture rises in the absorber between the constricted walls of the absorber body where the mixture is forced into intimate contact with the water on both sides of the inner absorber walls and the screen adjacent to it. The hydrogen substantially freed from the ammonia flows from the absorber through conduit 7 and the water which has absorbed the ammonia passes down through the tubular bottom section of the absorber and out the conduit 21 to the receiver 22 where it passes by conduit 23 to the generator or heater 10 where the ammonia is again driven from the water by boiling and passes again for reuse to conduit 11, the water again passing up through conduit 17 to the absorber. Heat is supplied to the boiler by the gas flame 24, or other source.

The screen 19 in the absorber 6 may be welded to the sides of the absorber as shown at 25 and if desired springs 26 may be placed between the sections of the screen in the flat portion of the absorber or the springs could be used without the welding if desired.

The absorber body has flat plates with openings therethrough around the absorber, which are substantially normal to the absorber surface, and which are flanged as at 28 to add additional strength to the plates to resist outward deformation of the plates by the absorber due to the high pressure within the body of the absorber. Strength is particularly required to avoid the expansion of the flat sides of the absorber. These plates form fins to conduct the heat of the absorption from the absorber. The tendency of the absorber body to expand always maintains an intimate contact between the absorber body and the plates. The plates may be flanged at their front and back as shown at 29 to add additional strength to them.

If desired, the screen within the absorber could be omitted and the inner wall of the body of the absorber 6 could be grooved by alternate sloping grooves as shown at 30 in Figure 6 and also as shown in Figure 7. These alternate grooves on the inner surface of the absorber which extend both around the upper and lower cylindrical portions as well as the plane intermediate portions lead the water to flow by gravity and capillary attraction and surface tension over the whole inner wall of the absorber. The downwardly turned edges of the trough 18 contact the projections of the grooved wall as shown in Figure 6 so as to obtain an even distribution of the water through the length of the absorber.

It has been found that the surface tension between the water and the metal surfaces, that is the screen and inner surface of the absorber body, including the grooves, is improved by oxidizing the surfaces in a non-reducing furnace at a moderately high temperature.

In the use of this type of absorber, the water system can be filled to an extent that the water with the absorbed vapor will remain at a predetermined depth in the lower section of the absorber 6 before flowing out at 21 to the receiver and generator.

Although the invention has been described in detail and with some possible modifications it is apparent that other modifications can be made within the scope of the invention and equivalent devices may be used to obtain the same results without departing from the scope of the invention.

What is claimed as new and is desired to be secured by Letters Patent is:

1. A gas-vapor separator comprising a substantially vertically positioned hollow body having closely spaced walls of substantially equal area facing each other, means to introduce a gas-vapor mixture within and substantially across the lower portion of the body between the spaced walls, the gas-vapor mixture rising and being confined by the spaced walls to spread it into a sheet within the body while passing therethrough, means to flow a liquid having a greater affinity for absorbing the vapor than the gas into and substantially across the upper facing portions of both walls of the body and disperse it downwardly substantially equally on both walls substantially over the inner walls of the body in contact with the gas-vapor mixture to absorb the vapor from the gas and means to separately remove the gas and the liquid with the absorbed vapor from the body.

2. For use in a refrigerator of the uniform pressure type, an absorber for separating a cooling vapor from a gas comprising a substantially vertically positioned hollow body having closely spaced walls of substantially equal area facing each other, means to introduce a gas-vapor mixture within the body between the spaced walls, the gas-vapor mixture rising and being confined by the spaced walls to spread it into a sheet within the body while passing therethrough, means to flow a liquid having a greater affinity for absorbing the vapor than the gas into and substantially across the upper facing portion of both walls of the body and disperse it downwardly substantially equally on both walls substantially over the inner walls of the body in contact with the gas-vapor mixture to absorb the vapor from the gas and means to separately remove the gas and the liquid with the absorbed vapor from the body, conduits to lead the gas-vapor mixture to the body and the gas therefrom, said conduits being juxtaposed adjacent the body to cool the gas leaving the body by the gas-vapor mixture entering the body.

3. An absorber operating at a pressure higher than atmospheric and dissipating the heat of absorption to the surrounding medium at a lower external pressure comprising a substantially vertically positioned hollow body having closely spaced walls of substantially equal area facing each other, means to introduce a gas-vapor mixture within the body between the spaced walls, the gas-vapor mixture rising and being confined by the spaced walls to spread it into a sheet within the body while passing therethrough, means to introduce and to flow a liquid having a greater affinity for absorbing the vapor than the gas into and substantially across the upper facing portions of both walls of the body and disperse it downwardly substantially equally on both walls substantially over the inner walls of the body in contact with the gas-vapor mixture to absorb the vapor from the gas and means to separately remove the gas and the liquid with the absorbed vapor from the body and spaced means extending substantially over the external surface of the body to maintain the spaced walls of the body in their fixed relation.

4. An absorber operating at a pressure higher than atmospheric and dissipating the heat of absorption to the surrounding medium at a lower external pressure comprising a substantially vertically positioned hollow body having closely spaced walls of substantially equal area facing each other, means to introduce a gas-vapor mixture within the body between the spaced walls, the gas-vapor mixture rising and being confined by the spaced walls, to spread it into a sheet within the body while passing it therethrough, means to introduce and flow a liquid having a greater affinity for absorbing the vapor than the gas into and substantially across the upper facing portions of both walls of the body and disperse it downwardly substantially equally on the wall substantially over the inner walls of the body in contact with the gas-vapor mixture to absorb the vapor from the gas and means to separately remove the gas and the liquid with the absorbed vapor from the body and means rigidly connected to the body to dissipate the heat of absorption from the body.

5. An absorber operating at a pressure higher than atmospheric and dissipating the heat of absorption to the surrounding medium at a lower external pressure comprising a substantially vertically positioned hollow body having closely spaced walls of substantially equal area facing each other, means to introduce a gas-vapor mixture within the body between the spaced walls, the gas-vapor mixture rising and being confined by the spaced walls to spread it into a sheet within the body while passing therethrough, means to introduce and flow a liquid having a greater affinity for absorbing the vapor than the gas into and substantially across the upper facing portions of both walls of the body and disperse it downwardly substantially equally on both walls substantially over the inner walls of the body in contact with the gas-vapor mixture to absorb the vapor from the gas and means to separately remove the gas and the liquid with the absorbed vapor from the body and means to dissipate the heat of absorption from the body, said dissipating means also maintaining the spaced walls of the body in their fixed position.

6. A gas-vapor separator comprising a substantially vertically positioned hollow body having closely spaced walls of substantially equal area facing each other, means to introduce a gas-vapor mixture within the body between the spaced walls, the gas vapor mixture rising and being confined by the spaced walls to spread it into a sheet within the body while passing therethrough, means to introduce and flow a liquid having a greater affinity for absorbing the vapor than the gas into and substantially across the upper facing portions of both walls of the body and disperse it downwardly substantially equally on both walls substantially over the inner walls of the body in contact with the gas-vapor mixture to absorb the vapor from the gas and means to separately remove the gas and the liquid with the absorbed vapor from the body, said hollow body being positioned with one portion higher than another to flow the liquid over the walls thereof by gravity, the liquid entrance and gas removal being at the higher portion of the body and the gas-vapor mixture entrance and liquid with the absorbed vapor removal being at the lower portion of the body.

7. A gas-vapor separator comprising a hollow body having closely spaced walls facing each other, means to introduce a gas-vapor mixture within the body between the spaced walls, the gas-vapor mixture rising and being confined by the spaced walls to spread it into a sheet within the body and pass it therethrough, means to introduce and disperse a liquid having a greater affinity for absorbing the vapor than the gas substantially over the inner faces of said spaced walls of the body in contact with the gas-vapor mixture to absorb the vapor from the gas and means to separately remove the gas and the liquid with the absorbed vapor from the body, said hollow body being positioned with one portion higher than another to flow the incoming liquid over the walls thereof by gravity, said liquid dispersing means including as part of the body confronting walls above and contiguous to the spaced walls and a substantially horizontal trough with elongated sides within the body across its higher portion and between and spaced from each of said confronting walls of the body, the trough connecting with the liquid entrance at one end and being closed at the other to overflow liquid entering the trough on both sides to wet both the facing walls of the body, the gas removal being at the higher portion of the body and the gas-vapor mixture entrance and liquid with the absorbed vapor removal being at the lower portion of the body.

8. A gas-vapor separator comprising a hollow body having closely spaced walls facing each other, means to introduce a gas-vapor mixture within the body between the spaced walls, the gas-vapor mixture rising and being confined by the spaced walls to spread it into a sheet within the body and pass it therethrough, means to introduce and disperse a liquid having a greater affinity for absorbing the vapor than the gas substantially over the inner faces of said spaced walls of the body in contact with the gas-vapor mixture to absorb the vapor from the gas and means to separately remove the gas and the liquid with the absorbed vapor from the body, said hollow body being positioned with one portion higher than another to flow the incoming liquid over the walls thereof by gravity, said liquid dispersing means including as part of the body confronting walls above and contiguous to the spaced walls and a substantially horizontal trough with elongated sides within the body across its higher portion and between and spaced from each of said confronting walls of the body, the trough connecting with the liquid entrance at one end and being closed at the other to overflow liquid entering the trough on both sides, means within the trough and extending down adjacent both the inner facing walls of the body to lead the liquid entering the body and overflowing the trough by gravity and capillary attraction to wet said lead means and both said confronting walls of the body, the gas removal being at the higher portion of the body and the gas-vapor mixture entrance and liquid with the absorbed vapor removal being at the lower portion of the body.

9. A gas-vapor separator comprising a hollow body having closely spaced walls facing each other, means to introduce a gas-vapor mixture within the body between the spaced walls, the gas-vapor mixture rising and being confined by the spaced walls to spread it into a sheet within the body and pass it therethrough, means to introduce and disperse a liquid having a greater affinity for absorbing the vapor than the gas substantially over the inner walls of the body in contact with the gas-vapor mixture to absorb the vapor from the gas and means to separately remove the gas and the liquid with the absorbed vapor from the body, said hollow body being positioned with one portion higher than another to flow the incoming liquid over the walls thereof by gravity, said liquid dispersing means including as part of the body confronting walls above and contiguous to the spaced walls and a substantially horizontal trough with elongated sides within the body across its higher portion and between and spaced from each of said confronting walls of the body, the trough connecting with the liquid entrance at one end and being closed at the other to overflow liquid entering the trough on both sides, angularly extending grooves on both the inner facing walls of the body, leading from between the said confronting walls and trough to lead the liquid entering the body and overflowing the trough by gravity and capillary attraction to spread over both the inner facing walls of the body, the gas removal being at the higher portion of the body and the gas-vapor mixture entrance and liquid with the absorbed vapor removal being at the lower portion of the body.

10. A gas-vapor separator comprising a hollow body having closely spaced walls facing each other, means to introduce a gas-vapor mixture within the body between the spaced walls, the gas-vapor mixture rising and being confined by the spaced walls to spread it into a sheet within the body and pass it therethrough, means to introduce and disperse a liquid having a greater affinity for absorbing the vapor than the gas substantially over the inner walls of the body in contact with the gas-vapor mixture to absorb the vapor from the gas and means to separately remove the gas and the liquid with the absorbed vapor from the body, said hollow body being positioned with one portion higher than another to flow the incoming liquid over the walls thereof by gravity, said liquid dispersing means including a substantially horizontal trough within the body across its higher portion and spaced from the facing walls of the body, the trough connecting with the liquid entrance at one end and being closed at the other, a screen within the trough and extending adjacent the inner facing walls of the body to lead the liquid entering the body by capillary attraction to overflow the trough and wet the screen and both inner facing walls of the body, the gas removal being at the higher portion of the body and the gas-vapor mixture entrance and liquid with the absorbed vapor removal being at the lower portion of the body.

11. An absorber operating at a pressure higher than atmospheric and dissipating the heat of absorption to the surrounding medium at a lower external pressure comprising a hollow body having closely spaced walls of substantially equal area facing each other, means to introduce a gas-vapor mixture within the body between the spaced walls, the gas-vapor mixture rising and being confined by the spaced walls to spread it into a sheet within the body and pass it therethrough, means to introduce and disperse a liquid having a greater affinity for absorbing the vapor than the gas substantially over both the inner facing walls of the body in contact with the gas-vapor mixture to absorb the vapor from the gas and means to separately remove the gas and the liquid with the absorbed vapor from the body and cooling fins continuously fitting closely around the outside of the body against the exterior of the facing walls, substantially normal to the outer surface thereof to dissipate the heat of absorption from the body and to maintain the spaced walls of the body in their fixed relation.

12. An absorber operating at a pressure higher than atmospheric and dissipating the heat of absorption to the surrounding medium at a lower external pressure comprising a hollow body having closely spaced walls of substantially equal area facing each other, means to introduce a gas-vapor mixture within the body between the spaced walls, the gas-vapor mixture rising and being confined by the spaced walls to spread it into a sheet within the body and pass it therethrough, means to introduce and disperse a liquid having a greater affinity for absorbing the vapor than the gas substantially over both the inner facing walls of the body in contact with the gas-vapor mixture to absorb the vapor from the gas and means to separately remove the gas and the liquid with the absorbed vapor from the body, cooling fins continuously fitting closely around the outside of the body against the exterior of the facing walls substantially normal to the outer surface thereof to dissipate the heat of absorption from the body and to maintain the spaced walls of the body in their fixed relation, said fins being flanged adjacent the body to impart additional peripheral strength thereto.

13. An absorber using a liquid to absorb a vapor from an inert gas-vapor mixture comprising a body with vertical mid-section having facing closely spaced walls, connecting upper and lower horizontal cylindrical sections with a connection at one end of the lower section for the introduction of the gas-vapor mixture, a connection at one end of the upper section for the exit of the gas, a connection at the other end of the upper section for the introduction of liquid absorbent, a connection at the other end of the lower section for the draining of the absorbent liquid, a trough connected to the absorbent liquid inlet extending the horizontal length within the top of the upper section and having elongated sides spaced from the adjacent walls of the upper section and means for distributing the absorbent liquid from said trough to flow downwardly substantially equally over the internal surface of both facing walls of the body.

14. An absorber using a liquid to absorb a vapor from an inert gas-vapor mixture at a total pressure higher than atmospheric and dissipating the heat of absorption to the surrounding medium at a lower external pressure, an apparatus comprising a body with vertical mid-section having facing closely spaced walls, connecting upper and lower horizontal cylindrical sections with a connection at one end of the lower section for the introduction of the gas-vapor mixture, a connection at one end of the upper section for the exit of gas, a connection at the other end of the upper section for the introduction of liquid absorbent, a connection at the other end of the lower section for the draining of the absorbent liquid, a trough connected to the absorbent liquid inlet extending the horizontal length within the top of the upper section and having elongated sides spaced from the adjacent walls of the upper section and means for distributing the absorbent liquid from said trough to flow downwardly substantially equally over the internal surface of both facing walls of the body, said body being incased against the exterior of the facing walls and normal thereto in a multiplicity of vertically disposed metal sheets forming fins spaced to provide large cooling surfaces exposed to an ambient cooling medium passing therebetween and at the same time constituting a structural means for supporting the internal pressure of the body of the apparatus.

15. An absorber using a liquid to absorb a vapor from an inert gas-vapor mixture at a total pressure higher than atmospheric and dissipating the heat of absorption to the surrounding medium at a lower external pressure, an apparatus comprising a body with vertical midsection having facing closely spaced walls connecting upper and lower horizontal cylindrical sections with a connection at one end of the lower section for the introduction of the gas-vapor mixture, a connection at one end of the upper section for the exit of the gas, a connection at the other end of the upper section for the introduction of liquid absorbent, a connection at the other end of the lower section for the draining of the absorbent liquid, a trough connected to the absorbent liquid inlet extending the horizontal length within the top of the upper section and having elongated sides spaced from the adjacent walls of the upper section and means for distributing the absorbent liquid from said trough to flow downwardly substantially equally over the internal surface of both facing walls of the body, said body being incased against the exterior of the facing walls and normal thereto in a multiplicity of vertically disposed metal sheets forming fins spaced to provide large cooling surfaces exposed to an ambient cooling medium passing therebetween and at the same time constituting a structural means for supporting the internal pressure of the body apparatus, flanges on the vertical edges of said sheets forming the cooling fins to impart additional rigidity thereto to retain the body walls in fixed relation.

References Cited in the file of this patent

UNITED STATES PATENTS

| | | |
|---|---|---|
| 2,356,530 | Pflock | Aug. 22, 1944 |
| 2,559,720 | Hunter | July 10, 1951 |
| 2,596,785 | Nelly et al. | May 13, 1952 |
| 2,713,997 | Ruckstell | July 26, 1955 |